US007644404B2

(12) United States Patent
Rao et al.

(10) Patent No.: US 7,644,404 B2
(45) Date of Patent: Jan. 5, 2010

(54) NETWORK HAVING CUSTOMIZABLE GENERATORS AND ELECTRONIC DEVICE HAVING CUSTOMIZABLE UPDATING SOFTWARE

(75) Inventors: Bindu Rama Rao, Laguna Niguel, CA (US); Glenn Hamasaki, Jr., Aliso Viejo, CA (US); Sunil Marolia, Dana Point, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 753 days.

(21) Appl. No.: 10/860,964

(22) Filed: Jun. 4, 2004

(65) Prior Publication Data
US 2004/0250245 A1 Dec. 9, 2004

Related U.S. Application Data

(60) Provisional application No. 60/475,927, filed on Jun. 4, 2003.

(51) Int. Cl.
*G06F 9/44* (2006.01)
*H04M 3/00* (2006.01)
*G06F 9/445* (2006.01)

(52) U.S. Cl. .................. 717/169; 717/175; 455/418
(58) Field of Classification Search .............. 717/168, 717/174
See application file for complete search history.

(56) References Cited

U.S. PATENT DOCUMENTS

| 5,261,055 | A | 11/1993 | Moran et al. ............... 395/275 |
| 5,442,771 | A | 8/1995 | Filepp et al. ................ 395/650 |
| 5,479,637 | A | 12/1995 | Lisimaque et al. .......... 395/430 |
| 5,481,713 | A | 1/1996 | Wetmore et al. |
| 5,579,522 | A | 11/1996 | Christeson et al. .......... 395/652 |
| 5,596,738 | A | 1/1997 | Pope ........................... 395/430 |
| 5,598,534 | A | 1/1997 | Haas ....................... 395/200.09 |
| 5,608,910 | A | 3/1997 | Shimakura .................. 395/670 |
| 5,623,604 | A | 4/1997 | Russell et al. ............ 395/200.1 |

(Continued)

FOREIGN PATENT DOCUMENTS

CA 2339923 3/2000

(Continued)

OTHER PUBLICATIONS

Guanluca Moro, On the Event Coordination in Multi-Component Systems, Published on 2002, pp. 315-322.*

(Continued)

*Primary Examiner*—Tuan Q Dam
*Assistant Examiner*—Hanh T Bui

(57) ABSTRACT

Disclosed herein is a network having a customizable update generator and electronic devices having customizable updating software adapted to dynamically incorporate support for new instruction extensions in an existing instruction set. The customizable generator may be adapted to generate updates employing instruction sets executable by the customizable updating software in the electronic devices. The customizable updating software may be adapted to be dynamically enhanced and to support an enhanced instruction set. The updating software may be adapted to retrieve a complementary updating component during execution of an update. The electronic device may be adapted to employ at least one of several available and retrieved complementary update components during execution of an update. In conjunction with retrieved complementary update components, the updating software may be adapted to update the firmware, the software, the operating system, and other application components while employing an appropriate update to the electronic device.

29 Claims, 6 Drawing Sheets

U.S. PATENT DOCUMENTS

| | | | | |
|---|---|---|---|---|
| 5,666,293 | A | 9/1997 | Metz et al. | 395/200.5 |
| 5,752,039 | A | 5/1998 | Tanimura | 395/712 |
| 5,778,440 | A | 7/1998 | Yiu et al. | 711/154 |
| 5,790,974 | A | 8/1998 | Tognazzini | 701/204 |
| 5,878,256 | A | 3/1999 | Bealkowski et al. | 395/652 |
| 5,960,445 | A | 9/1999 | Tamori et al. | 707/203 |
| 6,009,497 | A | 12/1999 | Wells et al. | 711/103 |
| 6,038,636 | A | 3/2000 | Brown, III et al. | 711/103 |
| 6,064,814 | A | 5/2000 | Capriles et al. | 395/701 |
| 6,073,206 | A | 6/2000 | Piwonka et al. | 711/102 |
| 6,073,214 | A | 6/2000 | Fawcett | 711/133 |
| 6,088,759 | A | 7/2000 | Hasbun et al. | 711/103 |
| 6,105,063 | A | 8/2000 | Hayes, Jr. | 709/223 |
| 6,112,024 | A | 8/2000 | Almond et al. | 395/703 |
| 6,112,197 | A | 8/2000 | Chatterjee et al. | 707/3 |
| 6,126,327 | A | 10/2000 | Bi et al. | 395/200.51 |
| 6,128,695 | A | 10/2000 | Estakhri et al. | 711/103 |
| 6,157,559 | A | 12/2000 | Yoo | 365/52 |
| 6,163,274 | A | 12/2000 | Lindgren | 340/825.44 |
| 6,198,946 | B1 | 3/2001 | Shin et al. | 455/561 |
| 6,202,208 | B1 | 3/2001 | Holiday | |
| 6,279,153 | B1 | 8/2001 | Bi et al. | 717/11 |
| 6,311,322 | B1 | 10/2001 | Ikeda et al. | 717/1 |
| 6,438,585 | B2 | 8/2002 | Mousseau et al. | 709/206 |
| 2001/0029178 | A1 | 10/2001 | Criss et al. | 455/419 |
| 2001/0047363 | A1 | 11/2001 | Peng | 707/104.1 |
| 2001/0048728 | A1 | 12/2001 | Peng | 375/354 |
| 2002/0078209 | A1 | 6/2002 | Peng | 709/227 |
| 2002/0116261 | A1 | 8/2002 | Moskowitz et al. | 705/14 |
| 2002/0131404 | A1 | 9/2002 | Mehta et al. | 370/352 |
| 2002/0152005 | A1 | 10/2002 | Bagnordi | 700/234 |
| 2002/0156863 | A1 | 10/2002 | Peng | 709/217 |
| 2002/0157090 | A1 | 10/2002 | Anton, Jr. | 717/178 |
| 2003/0033599 | A1 | 2/2003 | Rajaram et al. | 717/173 |
| 2003/0037075 | A1 | 2/2003 | Hannigan et al. | 707/500 |
| 2003/0061384 | A1 | 3/2003 | Nakatani | 709/245 |
| 2003/0182414 | A1* | 9/2003 | O'Neill | 709/223 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |
| WO | WO-02/25438 A | 3/2002 |
| WO | WO-02/41147 A | 5/2002 |
| WO | WO-03/010656 A | 2/2003 |

OTHER PUBLICATIONS

"Focus on OpenView A guide to Hewlett-Packard's Network and Systems Management Platform", Nathan J. Muller, pp. 1-291, CBM Books, published 1995.

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1st ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

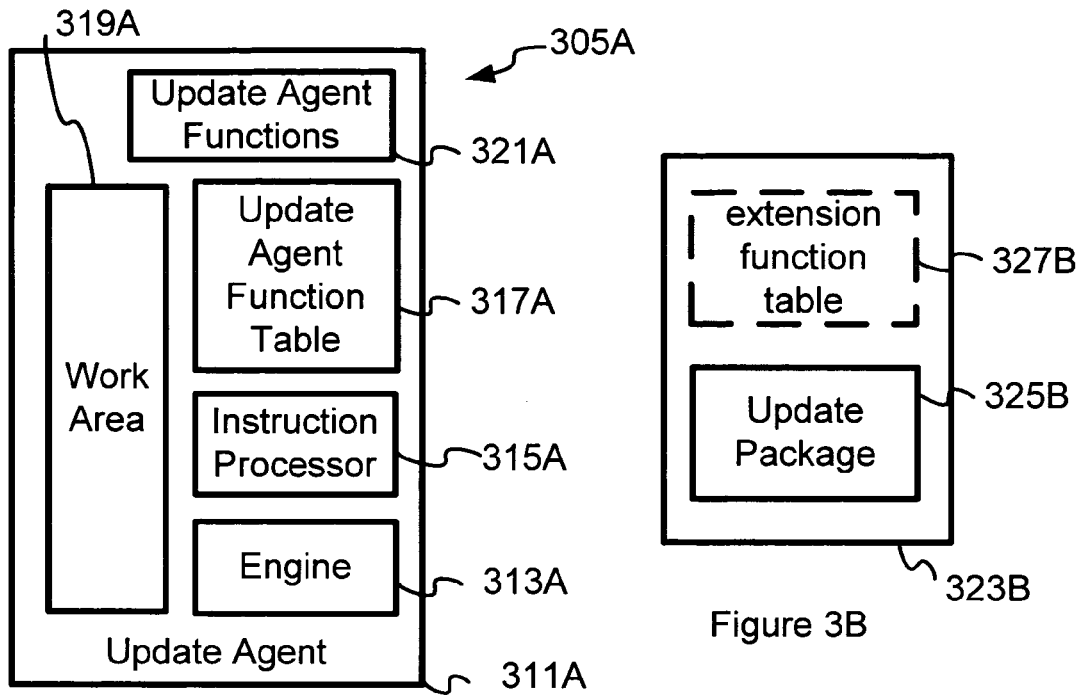
Figure 3A
Figure 3B
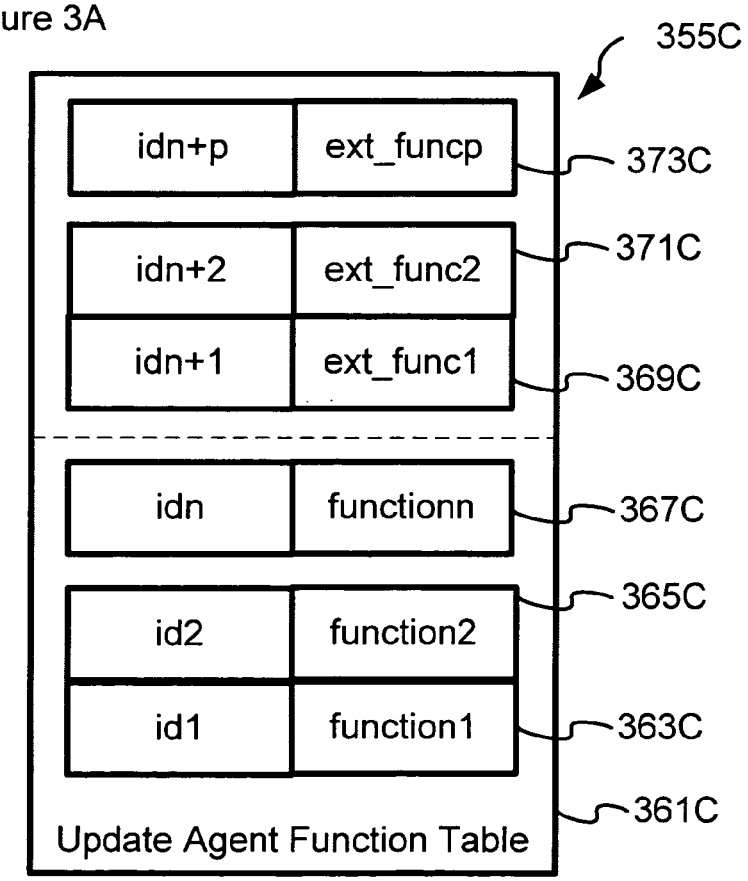
Figure 3C

NETWORK HAVING CUSTOMIZABLE GENERATORS AND ELECTRONIC DEVICE HAVING CUSTOMIZABLE UPDATING SOFTWARE

CROSS-REFERENCE TO RELATED APPLICATIONS

The present application makes reference to, claims priority to and the benefit from U.S. Provisional Patent Application Ser. No. 60/475,927 entitled "Network Comprising Customizable Generators and Mobile Handsets with Customizable Update Agents", filed Jun. 4, 2003, the complete subject matter of which is hereby incorporated herein by reference in its entirety.

The present application also hereby incorporates herein by reference in its entirety, the complete subject matter of PCT Application having publication number WO 02/41147 A1 and PCT application number PCT/US01/44034, filed on Nov. 19, 2001.

The present application also hereby incorporates herein by reference in its entirety, the complete subject matter of U.S. Provisional Patent Application 60/249,606 filed on Nov. 17, 2000.

The present application also hereby incorporates herein by reference in its entirety, the complete subject matter of U.S. Provisional Patent Application 60/439,673, filed Jan. 13, 2003.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices such as mobile phones and personal digital assistants (PDA's) often contain firmware and application software that are either provided by the manufacturers of the electronic devices, by telecommunication carriers, or by third parties. These firmware and application software often contain software bugs. New versions of the firmware and software are periodically released to fix the bugs, to introduce new features, or both.

Electronic devices, such as mobile handsets, access servers to retrieve update packages that are needed to update firmware and/or software. When thousands of mobile handsets simultaneously attempt to access the servers, some of them may not be able to get connected. There is a need for wireless networks to determine if individual mobile handsets can be updated. There is a need for wireless networks to facilitate downloading of update packages by mobile handsets.

Creating efficient and compact update packages for firmware/software updates is a big challenge. Managing update packages efficiently in a carrier network is also a great challenge. Managing the lifecycle of firmware and software in electronic devices, such as mobile handsets, is a complicated and important task. Prior art updating of software and firmware entailed merely overwriting the entirety of an older existing version of software with an entirety of a newer or different version of software. The prior art process requires extensive memory resources and consumes valuable time.

Further limitations and disadvantages of conventional and traditional approaches will become apparent to one of ordinary skill in the art through comparison of such systems with the present invention as set forth in the remainder of the present application with reference to the drawings.

SUMMARY OF THE INVENTION

Aspects of the present invention may be found in a method of updating a mobile electronic device. The method may comprise embedding a first updating software component in the mobile electronic device. The first updating software component may comprise a plurality of first executable instructions. The method may also comprise receiving a second updating software component. The second updating software component may comprise a plurality of second executable instructions. The method may also comprise executing a portion of the plurality of first executable instructions and a portion of the plurality of second executable instructions during an update of one of firmware and software in the mobile electronic device.

In an embodiment according to the present invention, the method may further comprise converting a portion of the plurality of first executable instructions to second executable instructions while maintaining an unconverted balance of the plurality of first executable instructions. The method may also comprise incorporating the second executable instructions into a multi-component updating software and executing the second executable instructions together with the unconverted balance of the plurality of first executable instructions during the update.

In an embodiment according to the present invention, the method may further comprise performing the update. Performing the update may comprise independently converting at least a portion of an embedded existing code using at least one executable instruction.

In an embodiment according to the present invention, the method may further comprise employing a multi-component updating software to perform the update. The multi-component updating software may be adapted to autonomously and unilaterally be updated by performing at least one executable instruction in at least one updating software component.

In an embodiment according to the present invention, the method may further comprise generating an update. Generating the update may comprise generating a multi-component updating software. The multi-component updating software mat comprise at least one set of executable instructions and at least one complementary component. The complementary component may comprise at least one extension executable function. The at least one extension executable function may provide additional functionality to at least one executable instruction in the at least one set of executable instructions in the multi-component updating software.

In an embodiment according to the present invention, the method may further comprise determining new functions of code and incorporating the determined new functions of code into an updating software component. The method may also comprise determining new function reference portions for an updating software function component and incorporating the determined new function reference portions into the updating software function component.

In an embodiment according to the present invention, the method may further comprise generating updating software. The updating software may comprise a plurality of updating components adapted to interact during execution of the update. Each of the plurality of updating components may comprise a plurality of executable instructions. The plurality of updating components may provide different functionality together facilitating the updating of one of firmware and software in the mobile electronic device.

In an embodiment according to the present invention, the method may further comprise generating an update. The update may comprise an updating component generated in an update-generating device. The update may also comprise an extension table. The extension table may provide the update with additional functionality.

Aspects of the present invention may be found in updating software for updating a mobile electronic device. The updating software may comprise a plurality of original executable update instructions resident in the mobile electronic device. The updating software may also comprise a plurality of new executable update instructions being receivable into the mobile electronic device. At least a portion of the original executable update instructions and at least a portion of the new executable update instructions may be executed during an update of one of firmware and software in the mobile electronic device.

In an embodiment according to the present invention, the updating software may further comprise a plurality of updating components. The plurality of updating components may be complementary and may together functionally form the updating software.

In an embodiment according to the present invention, the updating software may further comprise a plurality of executable instruction sets. At least one of the plurality of executable instructions sets may be adapted to be incorporated as an extension of a default executable instruction set.

In an embodiment according to the present invention, the updating software may further comprise a plurality of updated executable instructions. At least one of the plurality of updated executable instructions may be substituted for outdated executable instructions in a set of executable instructions forming the updating software.

In an embodiment according to the present invention, the updating software may further comprise a plurality of executable update instructions. The plurality of executable update instructions may comprise current executable update instructions and outdated executable update instructions. The outdated executable update instructions may be removed and replaced with new executable update instructions during the update.

In an embodiment according to the present invention, the updating software may further comprise a plurality of executable instructions for updating one of firmware and software from one version to another version in the mobile electronic device.

In an embodiment according to the present invention, wherein the updating software may be independent of one of a particular mobile electronic device model and a particular mobile electronic device manufacturer.

In an embodiment according to the present invention, the updating software may further comprise updating software updating instructions. The updating software updating instructions may enable the updating software to autonomously and unilaterally be updated by performing at least one of the updating software updating instructions.

In an embodiment according to the present invention, the updating software may further comprise a complementary update component. The complementary update component may comprise a plurality of updating software-updating instructions. The updating software updating instructions may be adapted to enhance functionality of the updating software.

In an embodiment according to the present invention, the updating software may further comprise a multi-component updating software. The multi-component updating software may employ a set of executable instructions and a complementary table of extension executable functions providing additional functionality to one of the set of executable instructions and the multi-component updating software.

In an embodiment according to the present invention, the updating software may further comprise an updating component generated in an update generating device and an extension table. The extension table may provide the updating software with additional functionality.

Aspects of the present invention may be found in a mobile electronic device comprising a non-volatile memory, a controller, and updating software. At least one component of the updating software may be stored in the non-volatile memory. The updating software may comprise a set of executable instructions for converting a first version of code to a second version of code in the mobile electronic device.

In an embodiment according to the present invention, the updating software may further comprise a plurality of updating components having different functionality that together may be adapted to update one of firmware and software in the mobile electronic device.

In an embodiment according to the present invention, the updating software may be adapted to retrieve at least one complementary updating component comprising executable update instructions. The updating software may also be able to execute the executable update instructions during an update.

In an embodiment according to the present invention, the updating software comprises a plurality of original executable update instructions and a plurality of new executable update instructions. At least a portion of the original executable update instructions and at least a portion of the new executable update instructions may be executed during an update of one of firmware and software in the mobile electronic device.

In an embodiment according to the present invention, the updating software may comprise a plurality of updating components. The plurality of updating components may be complementary and together functionally form the updating software.

In an embodiment according to the present invention, the updating software may comprise a plurality of executable instruction sets, wherein at least one of the plurality of executable instructions sets is adapted to be incorporated as an extension of a default executable instruction set.

In an embodiment according to the present invention, the updating software may comprise a plurality of updated executable instructions. The updated executable instructions may be substituted for outdated executable instructions in a set of executable instructions forming the updating software.

In an embodiment according to the present invention, the updating software may comprise a plurality of executable update instructions. The plurality of executable update instructions may comprise current executable update instructions and outdated executable update instructions. The outdated executable update instructions may be removed and replaced with new executable update instructions during an update.

In an embodiment according to the present invention, the updating software may comprise a plurality of executable instructions for updating one of firmware and software from one version to another version in the mobile electronic device.

In an embodiment according to the present invention, the updating software may be independent of one of a particular mobile electronic device model and a particular mobile electronic device manufacturer.

In an embodiment according to the present invention, the mobile electronic device may further comprise updating software updating instructions. The updating software updating instructions may enable the updating software to autonomously and unilaterally be updated by performing at least one of the updating software updating instructions.

In an embodiment according to the present invention, the mobile electronic device may further comprise a complementary update component comprising a plurality of updating software-updating instructions. The updating software instructions may be adapted to enhance functionality of the updating software.

In an embodiment according to the present invention, the mobile electronic device may further comprise a multi-component updating software. The multi-component updating software may comprise a set of executable instructions and a complementary component. The complementary component may comprise extension executable functions providing additional functionality to one of the set of executable instructions and the multi-component updating software.

BRIEF DESCRIPTION OF SEVERAL VIEWS OF THE DRAWINGS

FIG. 3A is a block diagram illustrating an exemplary update agent for an exemplary electronic device according to an embodiment of the present invention;

FIG. 3B is a block diagram illustrating exemplary contents of an exemplary enhanced update package according to an embodiment of the present invention;

FIG. 3C is a table illustrating exemplary update agent functions for an exemplary update agent according to an embodiment of the present invention.

DETAILED DESCRIPTION OF THE INVENTION

Aspects of the present invention may be found in an exemplary method and system for updating firmware/software components in exemplary electronic devices employing exemplary updating software. The exemplary updating software may comprise an exemplary update agent having enhanced functionality.

Aspects of the present invention may be found in an exemplary method of updating firmware/software components in electronic devices. More specifically, aspects of the present invention may be found in an exemplary method of updating firmware and software in a variety of electronic devices, such as, for example, mobile handsets, cellular telephones, personal digital assistants, pagers, personal computers, etc.

In an embodiment according to the present invention, firmware may be considered software placed in a read-only memory device in an embedded system in an electronic device. Firmware may also comprise software necessary to boot, initialize, and execute the embedded software.

In an embodiment according to the present invention, flash memory may be a memory resource re-programmable or writeable in the field, for example. Flash memory has many characteristics that make it distinct from other types of memory. Flash memory may also be used as read-only memory.

In an embodiment according to the present invention, an update package may be defined as a collection of data/meta-data and executable update/upgrade instructions that when bundled and delivered to an electronic device updating software (update agent) are adapted to facilitate firmware/software updates in the electronic devices.

In an embodiment according to the present invention, an update agent may be defined as updating software for performing an update of code, firmware, and/or software in an electronic device. The data/meta-data may comprise information associated with loading executable update(s)/upgrade(s) instructions and verifying the contents of the executable update(s)/upgrade(s) instructions and associated instructions. The executable update/upgrade instructions may comprise a list of independent program changes facilitating migration from one version of electronic device firmware/software to another.

In an embodiment according to the present invention, an update may be performed by independently converting (updating/upgrading) a portion or portions of existing code (firmware or software) using at least one or a plurality of executable instructions instead of merely copying/overwriting an entirely new version of firmware or software over an older existing version, as taught in prior art updates.

Aspects of the present invention may be found in a method comprising determining new functions of code, incorporating new functions of code, determining new function reference portions for an update agent function table, incorporating the determined new function reference portions into the update agent function table.

Figure 1A:
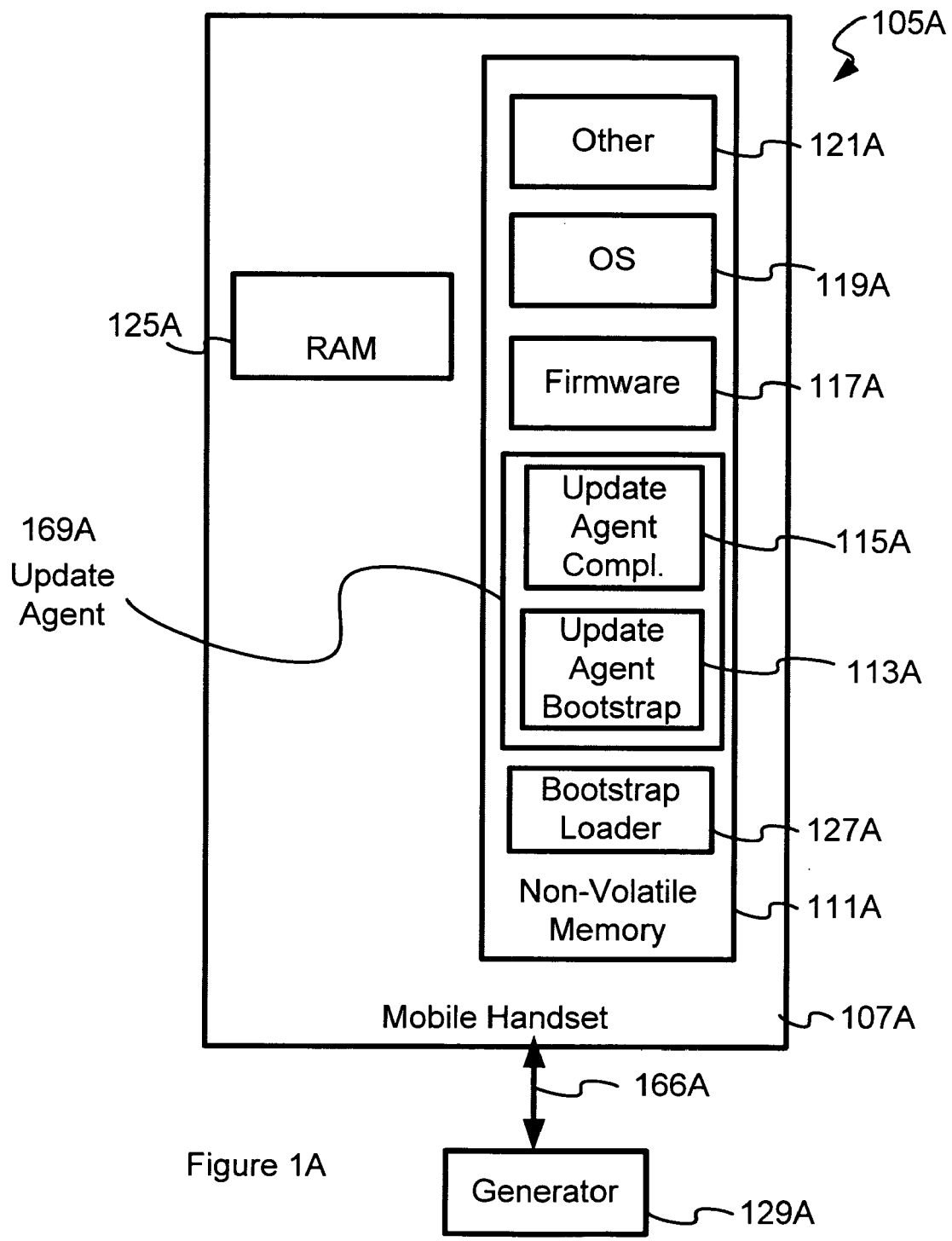
FIG. 1A is a block diagram illustrating an exemplary network having at least one customizable generator and an exemplary electronic device having at least one customizable update agent according to an embodiment of the present invention.

FIG. 1A is a block diagram illustrating an exemplary network 105A comprising at least one customizable generator 129A and an exemplary electronic device, for example, mobile handset 107A, having at least one customizable update agent 169A, according to an embodiment of the present invention. In FIG. 1A, the customizable generator 129A may be adapted to generate update packages employing instruction sets that may be executable by the customizable update agent 169A in a plurality of electronic devices, for example, mobile handset 107A. The generated update packages may be transmitted to the electronic devices, for example, mobile handset 107A, via a communications link 166A.

In an embodiment according to the present invention, the mobile handset 107A may comprise a random access memory (RAM) 125A and a non-volatile memory 111A. The non-volatile memory 111A may comprise an update agent 169A, a bootstrap loader 127A, firmware 117A, an operating system (OS) 119A, and other software/application components 121A. The update agent 169A may comprise an update agent bootstrap component 113A and an update agent complementary component 115A. Together, the update agent bootstrap component 113A and an update agent complementary component 115A form updating software (i.e., a complete update agent) having divided functionality between the two cooperating components.

In an embodiment according to the present invention, updating software (i.e., an update agent), such as, for example, update agent 169A illustrated in FIG. 1A, in an electronic device, for example, mobile handset 107A, as illustrated in FIG. 1A, may comprise a parsing component (not shown) and a processing component (not shown). The parsing component (not shown) may be separate and/or decoupled from the processing component (component).

In an embodiment according to the present invention, the updating software (i.e., update agent) may be enhanced by incorporating additions (or extensions) to the parsing component (not shown), to the processing component (not shown), or to both. The updating software (i.e., the update agent) may comprise a plurality of components, wherein each of the components may have a different functionality. Together, the plurality of components may be adapted to interact during execution of an update and form a complete update agent having divided functionality.

The update agent bootstrap component 113A may be adapted to interact with the update agent complementary component 115A during execution of an update, for example. The electronic device, for example, mobile handset 107A, may be adapted to employ at least one of several available, retrieved update agent complementary components 115A during execution of an update.

In conjunction with a retrieved update agent complementary component 115A, the update agent bootstrap component 113A may be adapted to update the firmware 117A, the operating system 119A, and other software/application components 121A. Updates may be performed upon firmware and software prior to "normal operation" of an electronic device, such as during a bootstrap process, for example.

In an embodiment according to the present invention, the update agent bootstrap component 113A may operate as a proxy for update agent 169A and may be adapted to retrieve additional portions of the update agent complementary component 115A and/or additional update agent complementary components in order to "complete the update agent", for example, update agent 169A, when invoked.

In an embodiment according to the present invention, the update agent 169A may be structured into two components in what may be termed as "mini-me" type architecture. A first update agent component, for example, may operate as an update agent bootstrap component 113A, as illustrated in FIG. 1A. The first update agent component may be adapted to retrieve and incorporate one or more additional update agent components, such as, for example, the update agent complementary component 115A.

An update agent complementary component, such as, for example, update agent complementary component 115A, may be larger than the update agent bootstrap component 113A. The update agent complementary component 115A may be adapted to complement and functionally complete an updating software, such as, for example, update agent 169A illustrated in FIG. 1A. The update agent complementary component 115A may be downloadable and/or retrievable during execution of an update.

The two update agent components, (the update agent complementary component 115A and the update agent bootstrap component 113A) may be adapted to work together as an update agent, such as, for example, update agent 169A, forming an updating software to update at least one of the firmware 117A, the operating system 119A, and the other software/applications components 121A in the electronic device, for example, mobile handset 107A.

A multi-component update agent, such as that described above with respect to FIG. 1A, may be executed in an electronic device, for example, mobile handset 107A. Although, in FIG. 1A, an exemplary two-component update agent is described, a multi-component update agent may comprise a plurality of updating software components (i.e., update agent components). Each of the plurality of update agent components may be adapted to work together forming updating software (i.e., an update agent) to update at least one of the firmware 117A, the operating system 119A, and the other software/applications components 121A in a plurality of electronic devices, such as for example, mobile handset 107A.

In a multi-component update agent according to an embodiment of the present invention, a first update agent component may be defined and operate as an update agent bootstrap component, such as the update agent bootstrap component 113A, as illustrated in FIG. 1A. A first update agent component, such as, for example, update agent boot strap component 113A, in a multi-component update agent, such as, for example, update agent 169A, may be adapted to retrieve a plurality of additional update agent components, such as, for example, update agent complementary component 115A, as set forth above, when invoked.

In an embodiment according to the present invention, when a first update agent component, (for example, an update agent bootstrap component 113A, as illustrated in FIG. 1A, or a proxy thereof), is executed, the first update agent component may evaluate a subscriber identity module (SIM) card, for example, searching for a "complementary" update agent component or alternatively, a complete update agent. The information of a SIM may reside in a hard-drive or a non-volatile memory, such as non-volatile memory 111A, as illustrated in FIG. 1A. Upon locating a "complementary" update agent component and verifying the "complementary" update agent component to be "authentic", the first update agent component may incorporate the "complementary" update agent component forming updating software for processing corresponding update packages.

In an embodiment according to the present invention, the first update agent component may be adapted to employ a complementary update package component associated with a "complementary" update agent component, without "updating" the first update agent component, for example, operating as an update agent proxy. In another embodiment according to the present invention, the first update agent component may be adapted to update itself.

In an embodiment according to the present invention, when more than one complementary update agent component or more than one complete update agent are located by the first update agent component, the first update agent component may evaluate the complementary update agent components and/or complete update agents.

The first update agent component may determine a latest one of the located complementary update agent components, or a more complete one of the located complete update agents, and incorporate the determined update agent components or complete update agents into update package(s) processing. The first update agent component may incorporate individual executable update/upgrade instructions located in complementary update agent components or may incorporate the entirety of executable update/upgrade located in the complementary update agent components in forming updating software for migrating a first version of firmware/software to another version thereof.

In an embodiment according to the present invention, an update agent, such as, for example, update agent 169A, in an electronic device, such as, for example, the mobile handset 107A, illustrated in FIG. 1A, may be customizable during an update. New features may be incorporated into an existing customizable update agent, such as, for example, update agent 169A illustrated in FIG. 1A.

Modifications to instruction sets employed by update packages may be incorporated as extensions to a standard/default instruction set. Individual modified/updated/new executable instructions may be substituted or exchanged for outdated/defunct/old executable instructions in a set of executable update/upgrade instructions forming an update package according to an embodiment of the present invention. The majority of executable update/upgrade instructions in a previous update package may remain intact, wherein new executable update/upgrade instructions may be inserted into the update package instruction set replacing outdated/defunct/old executable instructions.

In an embodiment according to the present invention, an update package may comprise an associated update agent extension table, such as, for example, a table or listing of code providing new/additional instructions that an update agent, such as, for example, update agent 169A illustrated in FIG. 1A, may execute in processing an associated update package (s). The update agent, such as, for example, update agent 169A, may incorporate code for the new/additional instructions in a set and employ the code in processing the remainder of the update package(s).

In an embodiment according to the present invention, an update agent version may be communicated to a delivery server (not shown) in a carrier network (not shown). The update agent may be adapted to retrieve one or more compatible update packages, for example, update packages comprising a corresponding set of instructions executable by the update agent, such as, for example, update agent 169A illustrated in FIG. 1A.

When compatible update packages are unavailable or nonexistent, but update packages comprising a newer instruction set (or an alternative instruction set) are available and exist, the delivery server may send an available update package along with a corresponding instruction set extension (not shown in FIG. 1A), to the electronic device, for example, mobile handset 107A, as illustrated in FIG. 1A. The instruction set extension may comprise at least a portion of an update agent complementary component, such as, for example, update agent complementary component 115A illustrated in FIG. 1A.

An update package may be defined as being a compatible when the update package contains instructions executable by an update agent, such as, for example, update agent 169A illustrated in FIG. 1A, associated with a particular version of firmware, for example. The included instruction set extension (not shown in FIG. 1A) may provide code and/or data that may be temporarily or permanently incorporated into an existing updating software, (for example, to enhance the existing update agent's instruction set), to facilitate compatible processing of associated update package(s).

Third party vendors may be adapted to use the customizable generator 129A with a customizable generator's associated instruction set extensions to create a plurality of third party update packages. The existing update agents in the electronic devices, for example, mobile handset 107A, as illustrated in FIG. 1A, may be adapted to dynamically incorporate corresponding instruction set extensions through the use of an appropriate update agent complementary component, such as, for example, update agent complementary component 115A illustrated in FIG. 1A. The update agent complementary component 115A may be capable of processing the newer instruction set or instruction set extensions.

In an embodiment according to the present invention, replacement of an entirety of existing update agents with newer update agents may be unnecessary because an update agent may be structured into several components, wherein the components (executable instructions, for example) may be adapted to be replaced or swapped and new updated components (executable instructions, for example) may be incorporated into an existing updating software (i.e., update agent) to provide newer (or different) implementations.

In an embodiment according to the present invention, replacement of a whole update agent in an electronic device, for example, mobile handset 107A, as illustrated in FIG. 1A, may be unnecessary. In an embodiment according to the present invention, new or updated update agent components may be incorporated at during execution of an update, after a bootstrap component of the updating software (i.e., update agent) is executed.

In an embodiment according to the present invention, an update agent may be data driven. For example, the update agent may be independent of a particular electronic device model, FLASH memory particulars, etc. In an embodiment according to the present invention, an update agent may be employed to update a plurality of different electronic devices produced by a plurality of different manufacturers and having a plurality of different electronic device models.

In an embodiment according to the present invention, changing an instruction set employed by a generator, for example, customizable generator 129A, as illustrated in FIG. 1A, adapted to generate update packages may involve updating an electronic device's update agent. Changing the instruction set employed by a generator may comprise incorporating an enhanced instruction set facilitating additional electronic device services, such as, for example, electronic device gaming software applications.

Figure 1B:
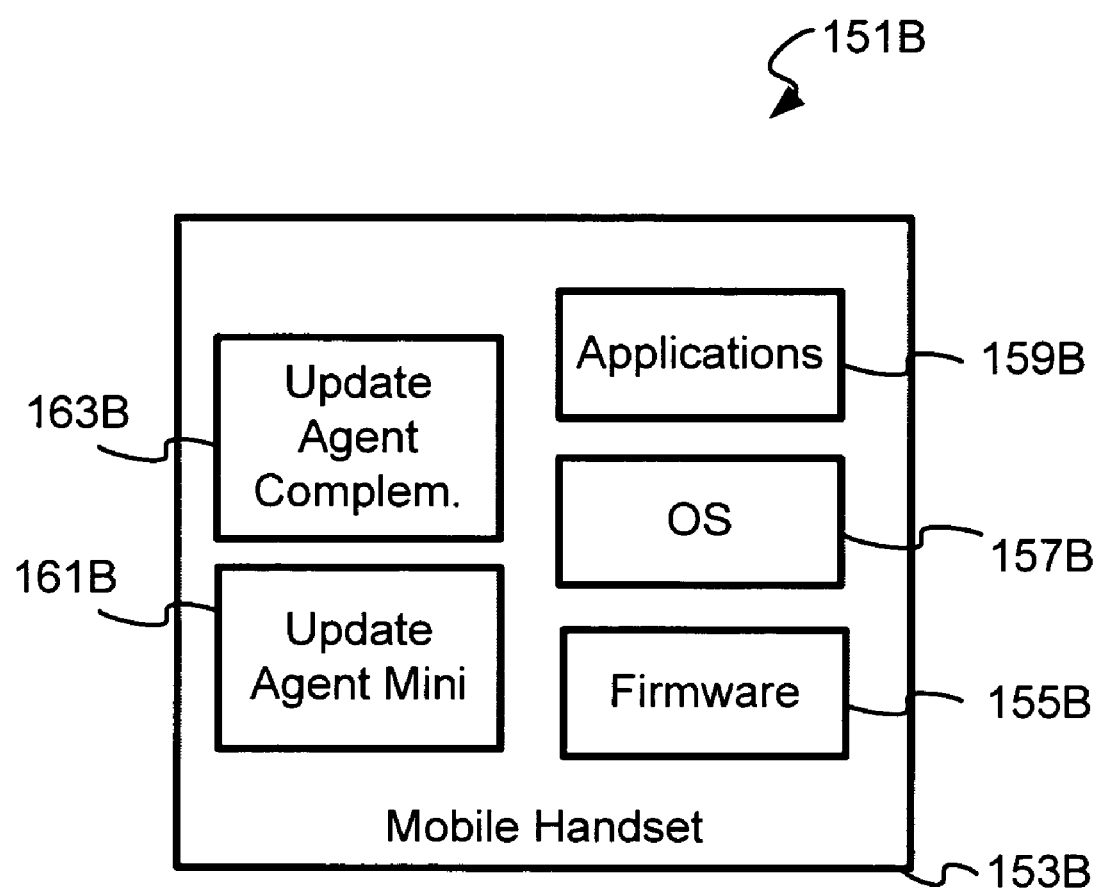
FIG. 1B is a block diagram illustrating an exemplary electronic device comprising an exemplary update agent mini-component and an exemplary update agent complementary-component retrievable from an external system according to an embodiment of the present invention.

FIG. 1B is a block diagram illustrating an exemplary electronic device 151B comprising an exemplary update agent mini component 161B and an exemplary update agent complementary component 163B retrievable from an external system (not shown) according to an embodiment of the present invention. FIG. 1B illustrates an exemplary electronic device 151B, for example, a mobile handset 153B, comprising an update agent mini component 161B. The mobile handset 153B illustrated in FIG. 1B may correspond, for example, to the mobile handset 107A illustrated in FIG. 1A.

The update agent mini component 161B may be complemented by an update agent complementary component 163B retrieved from an external system (not shown), such as an electronic device network server (not shown). The update agent complementary component 163B may be retrieved when the update agent mini component 161B is invoked in the electronic device, for example, mobile handset 153B.

The electronic device, for example, mobile handset 153B, as illustrated in FIG. 1B, may employ a "mini-me" type architecture for update agents. The update agent mini component 161B may be a complementary component of the update agent complementary component 163B. The combination of the update agent mini component 161B and the update agent complementary component 163B may be employed to update a firmware 155B, an operating system (OS) 157B, and/or applications 159B employing appropriate update packages, even when the electronic device, for example, mobile handset 153B, as illustrated in FIG. 1B, comprises more than one update agent.

Figure 2A:
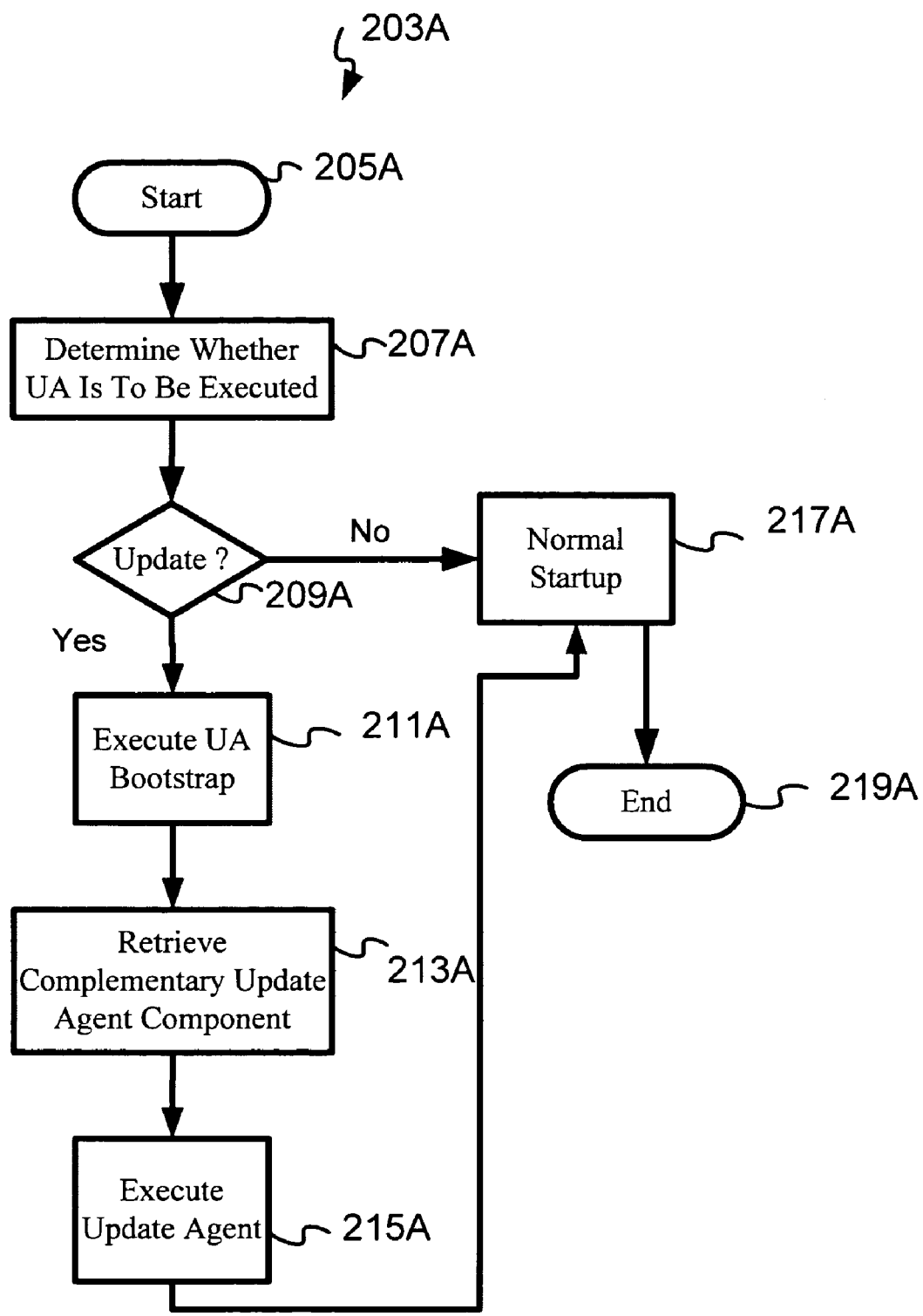
FIG. 2A is a flow chart illustrating an exemplary operation of an exemplary update agent bootstrap (update agent proxy) in an exemplary electronic device according to an embodiment of the present invention.

FIG. 2A is a flow chart 203A illustrating an exemplary operation of an exemplary update agent bootstrap (update agent proxy) in an exemplary electronic device according to an embodiment of the present invention. FIG. 2A illustrates, at a block 205A, the electronic device, for example, mobile handset 107A or 153B illustrated in FIG. 1A and FIG. 1B, respectively, may start processing, such as, for example, by powering up, rebooting, or initializing operations.

At a next block 207A, the electronic device may determine whether an update agent is to be executed. For example, when a bootstrap loader, such as bootstrap loader 127A, as illustrated in FIG. 1A, starts, an attempt may be made to determine whether the update agent, such as, for example, update agent 169A, is to be executed. If, at a next decision block 209A, it is determined that an update is not available or desirable, then at a next block 217A, normal startup of the electronic device may be executed and startup processing may terminate at a next end block 219A.

If, however, at the decision block 209A, it is determined that an update is available or desirable, and then control may be passed to a next block 211A. At block 211A, an update agent bootstrap, such as update agent bootstrap component 113A, as illustrated in FIG. 1A, may be executed.

The update agent bootstrap component 113A may be adapted to retrieve a complementary update agent component, at next block 213A, such as update agent complementary component 115A, as illustrated in FIG. 1A, from a non-volatile memory, such as non-volatile memory 111A, as illustrated in FIG. 1A, in an electronic device, such as mobile handset 107A or 153B, as illustrated in FIG. 1A and FIG. 1B, or an external system (such as, an electronic device network server, for example, not shown).

At block 211A, the bootstrap update agent component 113A may determine a location (such as a universal resource locator (URL)), an address, etc., from where the update agent complementary component 115A may be retrieved. At a next block 213A, the bootstrap update agent component 113A may retrieve and incorporate the update agent complementary component. Together, the bootstrap update agent component 113A and the update agent complementary component 115A may form an update agent (updating software) having divided functionality.

The electronic device, such as mobile handset 107A or 153B illustrated in FIG. 1A and FIG. 1B, respectively, may execute an update agent. An update agent may comprise an update agent bootstrap component, such as update agent bootstrap component 113A, as illustrated in FIG. 1A, merged, combined, or incorporated with an update agent complementary component, such as update agent complementary component 115A, as illustrated in FIG. 1A.

In an embodiment according to the present invention, a firmware, such as firmware 117A, as illustrated in FIG. 1A, an operating system, such as operating system (OS) 119A, as illustrated in FIG. 1A, other software and/or applications, such as other software and/or application 121A, as illustrated in FIG. 1A, of the electronic device, such as mobile handset 107A or 153B, as illustrated in FIG. 1A and FIG. 1B, may be updated (or new components installed) based upon an update package(s) comprising a plurality of executable instructions for updating the firmware, etc. from one version to another in the electronic device.

In an embodiment according to the present invention, the update package(s) may have been previously downloaded to the electronic device or otherwise made available to the electronic device. At a next block 217A, normal startup of the electronic device may be executed and startup processing may terminate at end block 219A.

Figure 2B:
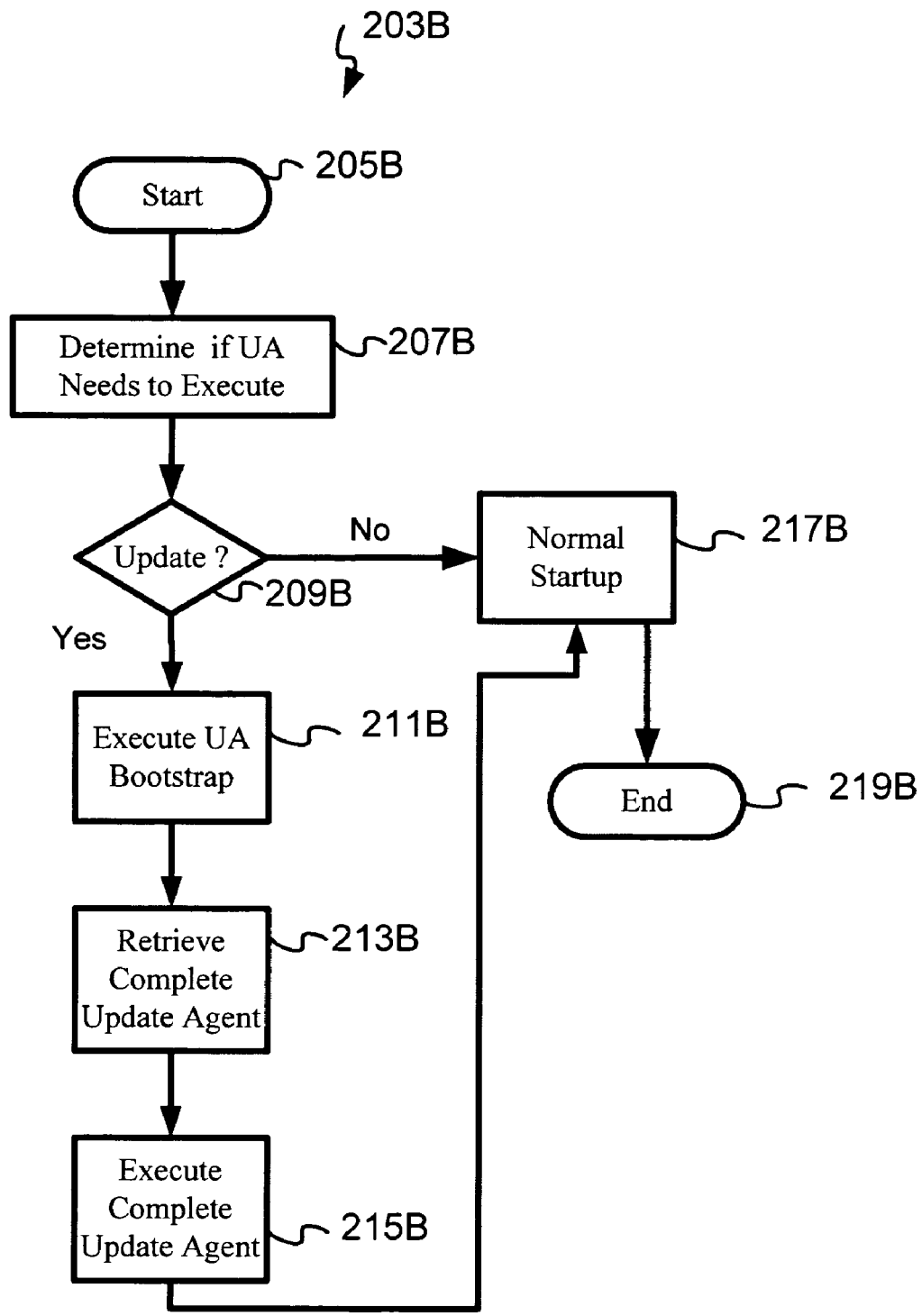
FIG. 2B is a flow chart illustrating an exemplary operation of an exemplary update agent bootstrap (update agent proxy) in an exemplary electronic device according to an embodiment of the present invention.

FIG. 2B is a flow chart 203B illustrating an exemplary operation of an exemplary update agent bootstrap (update agent proxy) in an exemplary electronic device according to an embodiment of the present invention. FIG. 2B illustrates, at a block 205B, the electronic device, for example, mobile handset 107A or 153B illustrated in FIG. 1A and FIG. 1B, respectively, may start processing, such as for example, by powering up, rebooting, or initializing operations.

At a next block 207B, the electronic device may determine whether an update agent, such as, for example, update agent 169A, illustrated in FIG. 1A, is to be executed. For example, when a bootstrap loader, such as bootstrap loader 127A, as illustrated in FIG. 1A, starts, an attempt may be made to determine whether the update agent, such as, for example, update agent 169A, is to be executed. If, at a next decision block 209B, it is determined that an update is not available or desirable, then at a next block 217B, normal startup of the electronic device may be executed and startup processing may terminate at a next end block 219B.

If, however, at the decision block 209B, it is determined that an update is available or desirable, and then control may be passed to a next block 211B. At block 211B, an update agent bootstrap, such as update agent bootstrap component 113A, as illustrated in FIG. 1A, may be executed. The update agent bootstrap component 113A may be adapted to retrieve a complete update agent 213B, such as, for example, update agent 169A, as illustrated in FIG. 1A, from a non-volatile memory, such as non-volatile memory 111A, as illustrated in FIG. 1A, in an electronic device, such as mobile handset 107A or 153B, as illustrated in FIG. 1A and FIG. 1B, respectively, or an external system (such as an electronic device network server, for example, not shown).

At block 211B, the bootstrap update agent component 113A may determine a location (such as a universal resource locator (URL)), an address, etc., from where the complete update agent 169A may be retrieved. At a next block 213B, the bootstrap update agent component 113A may retrieve and incorporate the complete update agent 169A. Together, the bootstrap update agent component 113A and the update agent complementary component 115A form a complete update agent having divided functionality.

The electronic device, such as mobile handset 107A or 153B, as illustrated in FIG. 1A and FIG. 1B, respectively, may execute a complete update agent. A complete update agent may comprise an update agent bootstrap component, such as update agent bootstrap component 113A, as illustrated in FIG. 1A, merged, combined, or incorporated with an update agent complementary component, such as update agent complementary component 115A, as illustrated in FIG. 1A.

In an embodiment according to the present invention, a firmware, such as firmware 117A, as illustrated in FIG. 1A, an operating system, such as operating system (OS) 119A, as illustrated in FIG. 1A, other software and/or applications, such as other software and/or application 121A, as illustrated in FIG. 1A, of the electronic device, such as mobile handset 107A or 153B, as illustrated in FIG. 1A and FIG. 1B, may be updated (or new components installed) based upon an update package(s) comprising a plurality of executable instructions for updating the firmware, etc. from one version to another in the electronic device.

In an embodiment according to the present invention, complete update package(s) may have been previously downloaded to the electronic device or otherwise made available to the electronic device. At a next block 217B, normal startup of the electronic device may be executed and startup processing may terminate at end block 219B.

FIG. 3A is a block diagram 305A illustrating an exemplary update agent 311A for an exemplary electronic device according to an embodiment of the present invention. FIG. 3A illustrates an update agent 311A for an electronic device, such as for example, mobile handset 107A or 153B, as illustrated in FIG. 1A and FIG. 1B, comprising an engine 313A, an instruction processor 315A, an update agent function table 317A, an update agent functions component 321A, and a work area 319A.

The update agent 311A may be adapted to incorporate additional executable instructions in an executable instruction set supported by the instruction processor 315A by incorporating additional (or replacement) functions into the update agent function table 317A, the update agent functions component 321A, and incorporating additional related data into work area 319A.

In an embodiment according to the present invention, the instruction processor 315A may be adapted to sequentially retrieve executable instructions from a file, communication link, data stream, etc., process the instructions employing the update agent function table 317A, and access services provided/supported by the engine 313A. The engine 313A may be adapted to initiate, manage, and terminate processing of update packages. The update packages may be enabled to update the firmware, the software, the operating system, the application components, the configuration data, or combinations thereof, of an electronic device, such as, for example, the mobile handset 107A or 153B illustrated in FIG. 1A and FIG. 1B, respectively.

In an embodiment according to the present invention, the work area 319A may be employed by the instruction processor 315A to store partially computed results, completely computed results, data, etc. encountered, used, or computed during processing of specific segments of the firmware, the software, the operating system, the application components, the configuration data, or combinations thereof, while processing an update package. The work area 319A may be employed to provide contextual information for sequential execution of at least two instructions.

In an embodiment according to the present invention, when the update agent 311A is provided processing capability for processing a plurality of new instructions, associated update agent functions employed in processing the plurality of new instructions may be included/incorporated into the update agent functions component 321A along with corresponding function reference portions in the update agent function table 317A.

In an embodiment according to the present invention, the update agent 311A and the update agent functions component 321A may, for example, reside in FLASH memory component set aside for update agent code and related data. The update agent function table 317A may also reside in the FLASH memory of an electronic device, such as for example, mobile handset 107A or 153B, as illustrated in FIG. 1A and FIG. 1B. Incorporating new code and new update agent function table entries for new instruction set extensions may be managed by the update agent 311A, in an embodiment according to the present invention.

FIG. 3B is a block diagram illustrating exemplary contents of an exemplary enhanced update package 323B according to an embodiment of the present invention. FIG. 3B illustrates an enhanced update package 323B comprising an actual update package 325B. The update package 325B may be generated by a generator, such as update generator 129A, as illustrated in FIG. 1A, and may contain difference information between two versions of software and/or firmware. The enhanced update package 323B may also comprise an extension function table 327B containing functions and data related to new instructions employable in the update package. The functions and related data may be used to enhance the instruction set currently supported by an update agent in an electronic device, such as for example, mobile handset 107A or 153B, as illustrated in FIG. 1A and FIG. 1B.

In an embodiment according to the present invention, for example, update agent 311A, as illustrated in FIG. 3A, may receive the enhanced update package 323B and may incorporate the extension function table 327B into update agent function table 317A, before processing the update package 325B. In an embodiment according to the present invention, the update agent 311A may receive the enhanced update package 323B and incorporate functions from the extension function table 327B into the update agent function table 317A upon encountering new instructions (those not currently supported) during processing of the update package 325B.

FIG. 3C is a table 355C illustrating exemplary update agent functions for an exemplary update agent according to an embodiment of the present invention. FIG. 3C illustrates an update agent function table 361C for an exemplary update agent, such as update agent 311A, as illustrated in FIG. 3A. The update agent 311A may be adapted to incorporate the contents of the extension function table 327B, as illustrated in FIG. 3B, into the update agent function table 361C.

The update agent function table 361C may comprise a set of function reference portions, for example, 363C, 365C, 367C, 369C, 371C, 373C, etc. Each function reference portion may comprise an identification portion and an associated function reference portion. For example, the identification portion id1, for example, and function reference portion function1, for example, may be defined as function reference portion 363C. The update agent function table 361C may comprise a plurality of function reference portions comprising a default set of function reference portions and a plurality of function reference portions incorporated from an extension function table 327B and provided by the enhanced update package 323B.

In an embodiment according to the present invention, the instruction processor 315A of the update agent 311A, as illustrated in FIG. 3A, may sequentially process the instructions provided by the update package 323B and employ an appropriate one of a plurality of functions supported by the update agent 311A, as determined by a corresponding function reference portion retrieved from the update agent function table 361C. Each instruction in the update package 325B, such as, for example, a CPY (COPY) instruction, a SET instruction, etc., may have a function reference portion in the update agent function table 361C. For every customized new instruction introduced by an update package, for example, enhanced update package 323B, an additional function reference portion may be created in the update agent function table 361C, such as function reference portions comprising customized instructions, such as for example, 369C, 371C, 373C, etc.

In an embodiment according to the present invention, the enhanced update package 323B, as illustrated in FIG. 3B, may not contain the extension function table 327B. In an embodiment according to the present invention, the update package 325B may employ new instructions that are currently unsupported by the update agent 311A.

When the instruction processor 315A, as illustrated in FIG. 3A, encounters any new instruction for the first time, for example, while attempting to retrieve an associated function reference portion from the update agent function table 361C, the instruction processor 315A may set a flag (or alternatively create an event in an event log) indicating a necessity to enhance the current instruction set. In response to setting the flag (or creating the event), the engine 313A, as illustrated in FIG. 3A, may initiate the identification, the location, and the downloading of the extension function table 327B from an electronic device network server (for example, a delivery server, not shown). The engine 313A may initiate incorporation of functions associated with the execution of the new instructions into the update agent 311A, before continuing the processing of the update package 323B.

In an embodiment according to the present invention, the update agent function table 361C may contain a plurality of function reference portions for a default set of functions, such as for example, function1, function2, functionn, etc. wherein each function may have a corresponding associated identification function reference portion, such as for example, id1, id2, idn, etc., respectively. The update agent function table 361C may also contain a plurality of function reference portions for a plurality of extension functions associated with extensions to instruction sets, for example, ext_func1, ext_func2, ext_funcp, etc. wherein each extension function may have a corresponding associated identification function reference portion, such as for example, idn+1, idn+2, idn+p, etc., respectively, associated with the extension function table or 327B accompanying update package 325B. The extension function table 327B may be incorporated into the update agent function table 361C by the update agent 311A.

Figure 4:
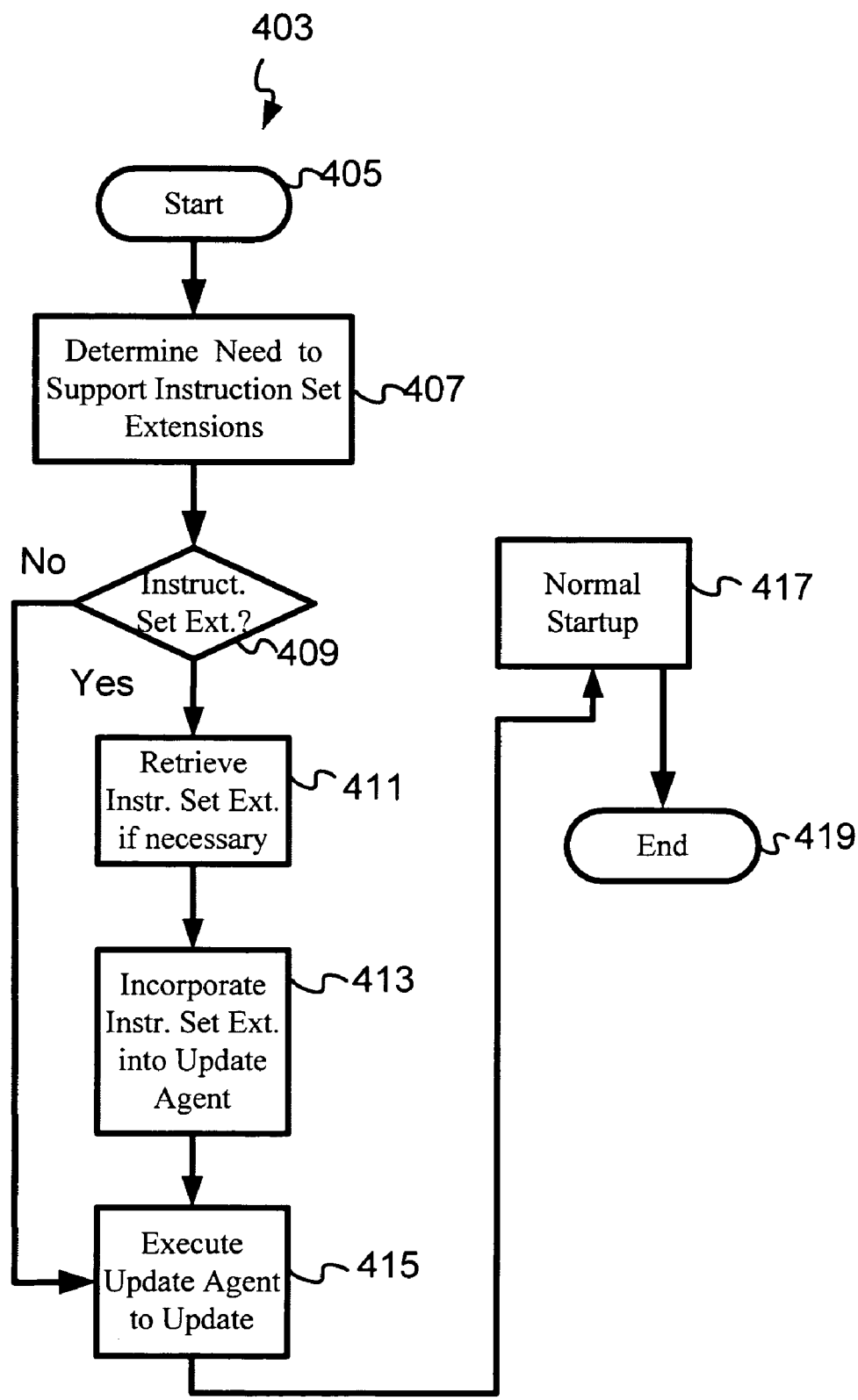
FIG. 4 is a flow chart illustrating an exemplary operation of an exemplary update agent in an exemplary electronic device according to an embodiment of the present invention.

FIG. 4 is a flow chart illustrating an exemplary operation of an exemplary update agent in an exemplary electronic device according to an embodiment of the present invention. FIG. 4 illustrates the operation of an update agent, such as update agent 311A, as illustrated in FIG. 3A, of an electronic device, such as for example, mobile handset 107A or 153B, as illustrated in FIG. 1A and FIG. 1B. The update agent 311A may be adapted to determine when to extend an instruction set, retrieve an extension function table, such as extension function table 327B, as illustrated in FIG. 3B, and accompanying code from an external system. The update agent 311A may be adapted to incorporate the retrieved extension functions and accompanying code into an update agent function table, such as, for example, update agent function table 361C, as illustrated in FIG. 3C.

At a start block 405, the update agent 311A, as illustrated in FIG. 3A, may start processing an update package having at least one instruction currently unsupported by an instruction processor, such as, for example, instruction processor 315A, as illustrated in FIG. 3A, of the update agent 311A. At a next block 407, the instruction processor 315A may determine whether to support a new instruction currently unsupported and whether to support instruction set extensions.

At decision block 409, an attempt may be made to determine whether to retrieve an instruction set extension from an external system. If it is determined that the instruction set extensions are to remain unsupported or the instruction sets are un-retrievable, control may be passed to a next block 415 where an existing update agent having an associated existing update agent function table with associated functions may be employed to update firmware and/or software in the electronic device. Normal startup of the electronic device or an application thereof may be initiated at a next block 417, with termination of startup processing at end block 419.

If, however, at decision block 409, it is determined that instruction set extensions are to be supported, then at a next block 411, extensions corresponding to a new set of instructions encountered in the update package may be retrieved. The extension table of functions and associated code (in binary form, byte code form, etc.) may be retrieved for incorporation into the update agent, for example, update agent 311A, as illustrated in FIG. 3A. At a next block 413, the retrieved extensions of the new instruction set may be incorporated into the update agent, for example, update agent 311A, as illustrated in FIG. 3A.

At a next block 415, an update of the firmware, the software, the operating system, the configuration information, etc. may be conducted by executing the update agent, for example, update agent 311A, as illustrated in FIG. 3A. At a next block 417, the electronic device, for example, mobile handset 107A or 153B, as illustrated in FIG. 1A and FIG. 1B, may be rebooted and/or an associated application may be initialized. At end block 419, update package processing may terminate.

In an embodiment according to the present invention, the network having a customizable generator and electronic devices with customizable update agents may be adapted to dynamically incorporate support for new instructions for a given instruction set. The customizable generator, for example, generator 129A, as illustrated in FIG. 1A, may be adapted to generate update packages employing instruction sets that may be deciphered by the customizable update agent, for example, update agent 311A, as illustrated in FIG. 3A, in an electronic device, for example, mobile handset 107A or 153B, as illustrated in FIG. 1A and FIG. 1B. The customizable update agent 311A may be adapted to be dynamically enhanced, such as by retrieving and supporting an enhanced instruction set.

In an embodiment according to the present invention, an update agent bootstrap, such as update agent bootstrap component 113A, as illustrated in FIG. 1A, may be employed in an electronic device, for example, mobile handset 107A or 153B, as illustrated in FIG. 1A and FIG. 1B, may be adapted to retrieve an update agent complementary component, such as update agent complementary component 115A, as illustrated in FIG. 1A, during execution of an update.

In an embodiment according to the present invention, an electronic device, for example, mobile handset 107A or 153B, as illustrated in FIG. 1A and FIG. 1B, may be adapted to retrieve and employ one of several available update agent complementary components, for example, update agent complementary component 115A, as illustrated in FIG. 1A, during execution of an update. In conjunction with the retrieved update agent complementary component 115A, the update agent bootstrap component 113A may be adapted to update the firmware 117A, operating system 119A, and/or other components 121A, for example, as illustrated in FIG. 1A, such as application components, etc. while employing an appropriate update package, such as for example enhanced update package 323B, as illustrated in FIG. 3B.

Although a system and method according to the present invention has been described in connection with the preferred embodiment, the present invention is not intended to be limited to the specific form set forth herein, but on the contrary, is intended to cover such alternative modifications and equivalents, as may be reasonably included within the spirit and scope of the present invention as defined by this disclosure and appended diagrams.

What is claimed is:

1. A method of updating a mobile electronic device, the method comprising:
executing a first updating software component comprising a plurality of first executable instructions in the mobile electronic device to retrieve, from non-volatile memory in the mobile electronic device, a second updating software component comprising a plurality of second executable instructions; and executing a portion of the plurality of first executable instructions and a portion of the plurality of second executable instructions together to form an updating software to update one of firmware and software in the mobile electronic device using updating information in an update package.

2. The method according to claim 1, comprising:

converting a portion of the plurality of first executable instructions to second executable instructions;

maintaining an unconverted balance of the plurality of first executable instructions;

incorporating the second executable instructions into a multi-component updating software; and executing the second executable instructions together with the unconverted balance of the plurality of first executable instructions during the update.

3. The method according to claim 1, comprising performing the update, wherein performing the update comprises independently converting at least a portion of the one of software and firmware in the mobile electronic device using at least one executable instruction.

4. The method according to claim 1, comprising employing a multi-component updating software to perform the update, the multi-component updating software being adapted to autonomously and unilaterally be updated by performing at least one executable instruction in at least one updating software component.

5. The method according to claim 1, comprising generating an update, wherein generating the update comprises generating a multi-component updating software, the multi-component updating software comprising at least one set of executable instructions and at least one complementary component comprising at least one extension executable function, the at least one extension executable function providing additional functionality to at least one executable instruction in the at least one set of executable instructions in the multi-component updating software.

6. The method according to claim 1, comprising:

determining new functions of code;

incorporating the determined new functions of code into an updating software component;

determining new function reference portions for an updating software function component; and incorporating the determined new function reference portions into the updating software function component.

7. The method according to claim 1, comprising generating updating software comprising a plurality of updating components adapted to interact during execution of the update, wherein each of the plurality of updating components comprise a plurality of executable instructions and the plurality of updating components providing different functionality that together facilitates updating of one of firmware and software in the mobile electronic device.

8. The method according to claim 1, comprising:

generating an update, the update comprising:

an updating component generated in an update generating device; and an extension table, wherein the extension table provides the update with additional functionality.

9. Updating software in at least one memory device in a mobile electronic device for updating the mobile electronic device, the updating software comprising:

a plurality of original executable update instructions resident in the mobile electronic device that are executed to retrieve a plurality of new executable update instructions from non-volatile memory in the mobile electronic device; and wherein at least a portion of the original executable update instructions and at least a portion of the new executable update instructions in the updating software are executed together to form an updating software to update one of firmware and software in the mobile electronic device using updating information in an update package.

10. The updating software in at least one memory device according to claim 9, comprising a plurality of updating components, the plurality of updating components being complementary and together functionally forming the updating software.

11. The updating software in at least one memory device according to claim 9, comprising a plurality of executable instruction sets, wherein at least one of the plurality of executable instructions sets is adapted to be incorporated as an extension of a default executable instruction set.

12. The updating software in at least one memory device according to claim 9, comprising a plurality of updated executable instructions, wherein at least one of the plurality of updated executable instructions are substituted for outdated executable instructions in a set of executable instructions forming the updating software.

13. The updating software in at least one memory device according to claim 9, comprising a plurality of executable update instructions, the plurality of executable update instructions comprising current executable update instructions and outdated executable update instructions, wherein the outdated executable update instructions are removed and replaced with new executable update instructions during the update.

14. The updating software in at least one memory device according to claim 9, comprising a plurality of executable instructions for updating one of firmware and software from one version to another version in the mobile electronic device.

15. The updating software in at least one memory device according to claim 9, wherein the updating software is independent of one of a particular mobile electronic device model and a particular mobile electronic device manufacturer.

16. The updating software in at least one memory device according to claim 9, comprising updating software updating instructions, the updating software updating instructions enabling the updating software to autonomously and unilaterally be updated by performing at least one of the updating software updating instructions.

17. The updating software in at least one memory device according to claim 9, comprising a complementary update component comprising a plurality of updating software updating instructions, the updating software updating instructions are adapted to enhance functionality of the updating software.

18. The updating software in at least one memory device according to claim 9, comprising a multi-component updating software, the multi-component updating software employing a set of executable instructions and a complementary table of extension executable functions providing additional functionality to one of the set of executable instructions and the multi-component updating software.

19. The updating software in at least one memory device according to claim 9, comprising:

an updating component generated in an update generating device; and an extension table, wherein the extension table provides the updating software with additional functionality.

20. A mobile electronic device comprising:
a non-volatile memory;
a controller; and
updating software comprising a plurality of updating software components, wherein a first updating software component is executed to retrieve at least a second updating software component stored in the non-volatile memory, and wherein the first updating software component and the second updating software component have different functionalities that together form an updating software adapted to update one of firmware and software in the mobile electronic device.

21. The mobile electronic device according to claim 20, wherein the updating software is executed to convert a first version of code in the mobile electronic device to a second version code in the mobile electronic device using updating information in an update package.

22. The mobile electronic device according to claim 20, wherein the updating software comprises:
a plurality of original executable update instructions; and
a plurality of new executable update instructions, wherein at least a portion of the original executable update instructions and at least a portion of the new executable update instructions are executed during an update of the one of firmware and software in the mobile electronic device.

23. The mobile electronic device according to claim 20, wherein the updating software comprises a plurality of executable instruction sets, wherein at least one of the plurality of executable instructions sets is adapted to be incorporated as an extension of a default executable instruction set.

24. The mobile electronic device according to claim 20, wherein the updating software comprises a plurality of updated executable instructions, wherein the updated executable instructions are substituted for outdated executable instructions in a set of executable instructions forming the updating software.

25. The mobile electronic device according to claim 20, wherein the updating software comprises a plurality of executable update instructions, the plurality of executable update instructions comprise current executable update instructions and outdated executable update instructions, wherein the outdated executable update instructions are removed and replaced with new executable update instructions during an update.

26. The mobile electronic device according to claim 20, wherein the updating software is independent of one of a particular mobile electronic device model and a particular mobile electronic device manufacturer.

27. The mobile electronic device according to claim 20, comprising updating software updating instructions, the updating software updating instructions enabling the updating software to autonomously and unilaterally be updated by performing at least one of the updating software updating instructions.

28. The mobile electronic device according to claim 20, comprising a complementary update component comprising a plurality of updating software updating instructions, wherein the updating software updating instructions are adapted to enhance functionality of the updating software.

29. The mobile electronic device according to claim 20, wherein the updating software employs a set of executable instructions and a complementary component comprising extension executable functions that provide additional functionality to one of the set of executable instructions and the updating software.

* * * * *